April 29, 1969

C. H. SAVIT 3,441,902

EXTENDABLE INTERSECTION HYDROPHONE ARRAYS

Filed April 1, 1968

INVENTOR
CARL H. SAVIT

By
Michael P. Breston
ATTORNEY

United States Patent Office 3,441,902
Patented Apr. 29, 1969

3,441,902
EXTENDABLE INTERSECTION HYDROPHONE ARRAYS
Carl H. Savit, Houston, Tex., assignor to Western Geophysical Company of America, Los Angeles, Calif., a corporation of Delaware
Filed Apr. 1, 1968, Ser. No. 717,534
Int. Cl. H04b 13/00, 13/02; G10k 11/00
U.S. Cl. 340—7
10 Claims

ABSTRACT OF THE DISCLOSURE

This invention relates to improved streamer cables for use in marine seismic exploration, and, more particularly, to improved streamer sections each comprising at least two overlapped component arrays of hydrophones for detecting reflected seismic waves during marine exploration. Means are provided to detachably connect at the end of each section, the component arrays of adjacent sections to obtain composite intersection arrays for spatial mixing of signals and for optimum attenuation of noise and of unwanted signals. Desirable hydrophone response patterns and curves can be selectively achieved.

Background of the invention

Marine seismic streamer cables to detect reflected sound waves are well known in the art. Such cables are disclosed, for example, in U.S. Patent No. 2,465,696, issued March 29, 1949 to Lee Roy C. Paslay, and in U.S. Patent No. 3,299,397, issued January 17, 1967, to G. M. Pavey, Jr. Typically a streamer cable is formed of a plurality of detachably coupled waterproof sections. Each section includes spaced, pressure-responsive transducers, such as hydrophones, arranged to form a single array. The seismic signals from each array are carried by a separate pair of conductors forming part of a sectioned cable which runs throughout the entire length of the streamer. Each such separate pair of conductors feeds its signals to suitable analog or digital recording equipment on board ship. While the streamer sctions are detachable and interchangeable, the sections' individual arrays are fixed.

It is also known to provide in streamers weighted arrays of detectors to achieve tapered weighting or sensitivity in some preferred direction. Several weighting functions and corresponding hydrophone array patterns are described in the literature for obtaining desirable response patterns.

Until this invention, as far as is known, no sections of marine seismic cables were provided with overlapped component arrays which could be easily and detachably connected, in the field at the end of each section, with the opposite component arrays of adjacent sections without disturbing the integrity and fluid-proofness of the sections, to obtain desirable spatial mixing of hydrophone signals.

Accordingly, it is a primary object of the present invention to provide new and improved streamer sections including overlapped component arrays which can be easily and detachably connected, in the field at the end of each section, with opposite component arrays of adjacent sections, thereby selectively obtain composite, overlapped intersection arrays.

It is another object of the present invention to provide new and improved streamer sections including overlapped component arrays which can be selectively and detachably connected with opposite component arrays of adjacent sections to provide relatively short or long, weighted and/ or unweighted arrays, thereby selectively obtain desirable hydrophone response curves and spatial mixing of hydrophone signals.

Summary of the invention

This invention involves a streamer cable formed of individual detachable sections. Each section houses a primary array and at least one overlapping secondary array, each array being arranged ot achieve optimum noise rejection and signal selection. Detachable coupling means are operatively connected to the overlapped component arrays to allow easy, intersection connections, at the end of each section, while maintaining the sections fluid-proof. The selectively extendable overlapped component arrays are used to form composite intersection arrays which yield desirable response curves and allow spatial mixing of inter-array signals.

One of the advantages of the present invention lies in the provision of improved streamer sections which allow to selectively and conveniently change the sections' effective array lengths. Another significant advantage lies in the ease with which an array can be changed from a non-tapered to a tapered configuration.

A further advantage lies in the ease with which spatial mixing of hydrophone signals can be achieved in seismic streamers.

These advantages are significant in the field especially when it is advantageous to combine the characteristics of short arrays, which provide greater resolution of subsurface detail, with the characteristics of long arrays, which generally have a wider reject band for noise and signals traveling along their axes. Because of the advantageous manner in which the electrical conductors of the component arrays terminate into detachable coupling means at the end of of each section, the sections remain waterproof during the intersection connections. Thus it is possible to quickly and easily connect and disconnect a number of sections in the field to form operable streamers of any desired effective length.

The novel features which are believed to be characteristic of the invention, both as to its organization and method of operation, together with further objects and advantages thereof will be better understood from the following description considered in connection with the accompanying drawings, in which presently preferred embodiments of the invention are illustrated by way of example. It is to be expressly understood, however, that the drawings are for the purpose of illustration and description only and are not intended as a definition of the limits of the invention.

Description of the preferred embodiment

Figure 1:
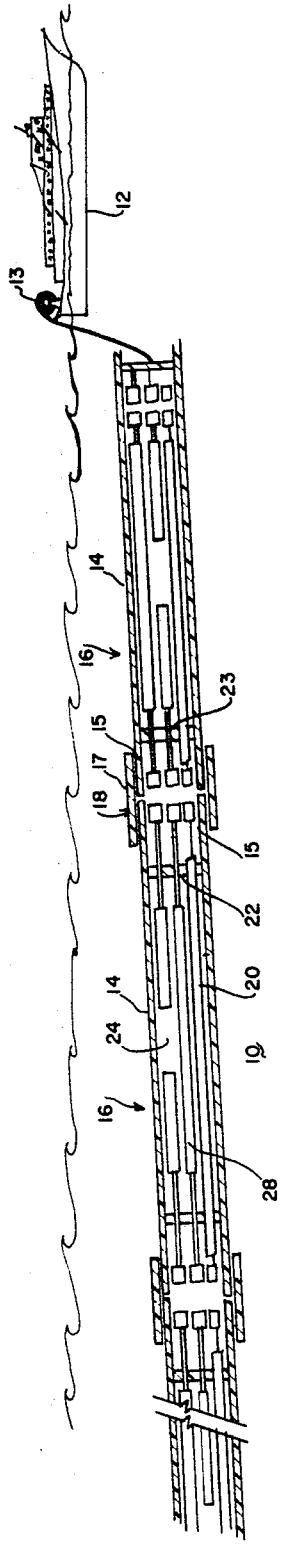
FIGURE 1 shows diagrammatically and partly in section a series of streamer sections coupled to form a seismic streamer cable.
Figure 2:
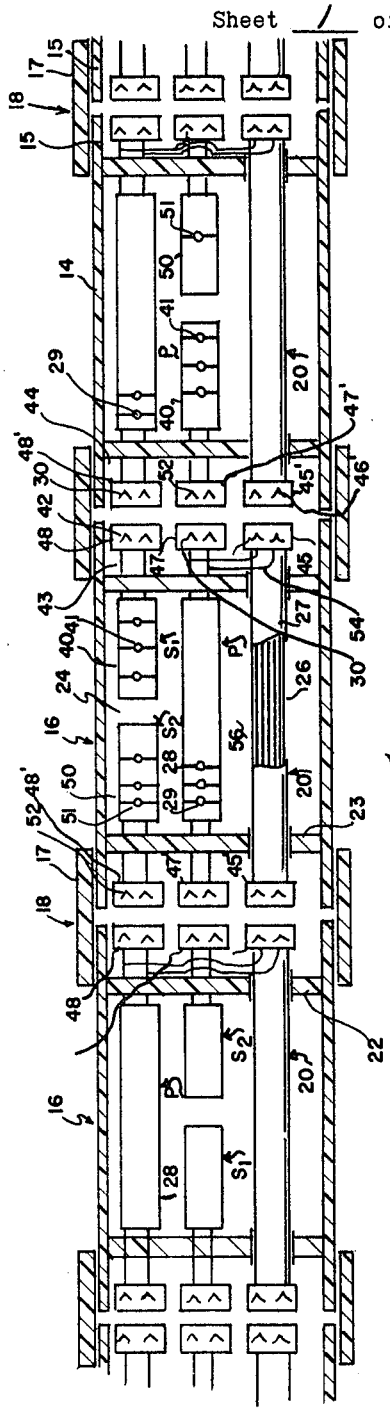
FIGURE 2 shows diagrammatically and partly in section a preferred embodiment of a streamer section used to form the cable of FIGURE 1.

Referring to FIGURES 1 and 2 there is shown a seismic streamer cable generally designated as 10 towed behind a boat 12. A reel 13 on the boat reels out the streamer into the water. Paravane means (not shown) are conventionally attached to cable 10 and arranged to maintain the cable at a predetermined depth below the water surface. The streamer 10 is made up of separate streamer sections 16. Each section consists of a very long flexible pipe 14 having end flanges 15. Pipe 14 is made of a suitable flexible plastic material such as polyvinyl chloride. The flanges 15 of each pair of adjacent pipes are coupled as by a flexible collar 17, to form a detachable joint 18. Sections 16 are constructed to be interchangeable within streamer 10, hence identical numerals will be assigned to identical parts for ease of understanding.

Near the flanges 15 of pipe 14 are positioned cylindrical end seals 22, 23. A chamber 24 is formed by the volume defined by the inner walls of pipe 14 and of seals 22, 23. Chamber 24 is made to contain, in a conventional manner, a suitable fluid typically light oil. End seals 22, 23 are made of a relatively hard plastic material such as neoprene or Teflon. A sectioned trunkline or cable 20 carries a plurality of conductors 26 covered with a protective plastic jacket 27. While only a few conductors 26 are shown, in practice as many as ninety-two or more conductors are used in cable 20.

Cable 20 provides to each section 16 a separate pair of conductors 28 which extend substantially along the entire length of section 16. Across conductors 28 are connected in parallel a first plurality of pressure detectors or hydrophones 29. The number of hydrophones 29, their individual sensitivity characteristics, and their relative spacings along conductors 28 are selected to meet the requirements of known design criteria and to form a primary array P. The detectors 29 convert pressure variations in the water surrounding the flexible pipe 14 into corresponding electric signals or voltages at pins 30 electrically connected to each end of conductors 28. Thus, primary array P delivers to pins 30 an electric signal $e_p$ which is determined both by the amplitude and phase of each signal generated in each detector 29.

In accordance with the present invention, at least two other pairs of conductors 40 and 50 are provided within each chamber 24. Across conductors 40 are again connected in parallel a second plurality of detectors 41 and across conductors 50 are connected in parallel a third plurality of detectors 51. Preferably hydrophones 41 are non-uniformly spaced along conductors 40 and extend from seal 22 toward the center of section 16 to form a first secondary array $S_1$. On the other hand hydrophones 51 are preferably non-uniformly spaced along conductors 50 and extend from seal 23 toward the center of section 16 to form a secondary array $S_2$. Tapered or weighted secondary array $S_1$ produces, in response to water pressure variations surrounding section 16, a resultant electric signal $e_{s1}$ at pins 42 electrically connected to conductors 40. Similarly, tapered array $S_2$ generates a resultant electric signal $e_{s2}$ at pins 52 electrically connected to conductors 50.

Primary array P and secondary arrays $S_1$, $S_2$ are enclosed in fluid-proof chamber 24. Other elements such as strain cables, spacers, etc., which are conventionally provided in streamer sections 16 are omitted from the drawings for the sake of clarity. Conductors 28, 40, 50, cable 20, as well as said other elements (not shown), pass through the end seals 22 and 23 in a leak-proof manner. The inner cylindrical walls of flanges 15 and the outer walls of end seals 22 and 23 form open-ended chambers 43, 44 respectively. Positioned in chamber 43 are: a male plug 45 carrying pins 46 electrically connected to conductors 26, a male plug 47 carrying pins 30 and a male plug 48 carrying pins 42. Positioned in the adjacent chamber 44 are: a female plug $45^1$ carrying pins $46^1$ electrically connected to conductors 26, a female plug $47^1$ carrying pins 52 and a female plug $48^1$ carrying pins 30. When mated plugs 47, $47^1$ and 48, $48^1$ are disconnected the secondary arrays $S_1$ and $S_2$ in each section are "floating." On the other hand, when plugs 45, 47, 48 are respectively coupled with their mating plugs $45^1$, $47^1$, $48^1$ the electric signals $e_{s1}$ and $e_{s2}$ from the first and second secondary arrays are combined with the electric signal $e_{sq}$ from the primary array to yield a composite electric signal $e_c$ which is transmitted by an individual pair of conductors 54, 56 through the trunkline 20 to an individual channel in the recording or processing equipment on board ship 12. The composite electric signal $e_c$ is the product of a composite array C consisting of a primary array P in one section and of secondary arrays $S_1$ and $S_2$ in the oppositely adjacent sections, all connected in parallel. Since the detachable coupling means 45, 47 and 48 and their mated counterparts $45^1$, $47^1$ and $48^1$ are positioned within the open-ended chambers 43, 44, both the integrity of the primary and secondary arrays and the fluid-proofness of chamber 24 are preserved during the coupling procedure.

In operation, the field operator can easily extend the primary array P of one section into a composite array C which extends substantially to the center of each adjacent section by merely coupling plugs 47 and 48, at the ends of each section 16, with plugs $47^1$ and $48^1$. The operator then couples plugs 45, $45^1$ and brings both flanges 15 of adjacent sections 16 together end-to-end, slides collar 17 over joint 18 to render chambers 43, 44 waterproof. To maintain collar 17 in place, suitable clamps (not shown) may be used.

Because each primary array P is coupled to at least one secondary array which overlaps a substantial portion of the primary array of an adjacent section, desirable spatial signal mixing or averaging is achieved. The mixing of signals in this manner conveniently yields seismic sections of greater clarity and continuity. As previously mentioned, secondary arrays $S_1$ and $S_2$ may be tapered to achieve higher resolution of certain selected frequency signals and hence of subsurface detail. A tapered array can also be designed to provide optimum response within a predetermined frequency pass band and maximum attenuation of noise within that band.

It is therefore apparent from the foregoing description that the streamer sections have arrays the parameters of which can be easily altered in the field to achieve signal mixing, optimum signal response and maximum noise attenuation. Because of the advantageous manner in which the detachable coupling means are positioned outside the waterproof chamber, the intersection connections are easily and conveniently performed in the field. Also, since sections 16 are interchangeable, any number of such sections can be interconnected to form relatively long streamers. In practice, twenty-four, thirty-six or forty-eight sections are coupled together to provide corresponding signals to recording channels on board ship 12. In a twenty-four section streamer, for example, the first and last sections have one of their secondary arrays "floating." Hence such a streamer can only have twenty-two composite arrays.

Figure 3:
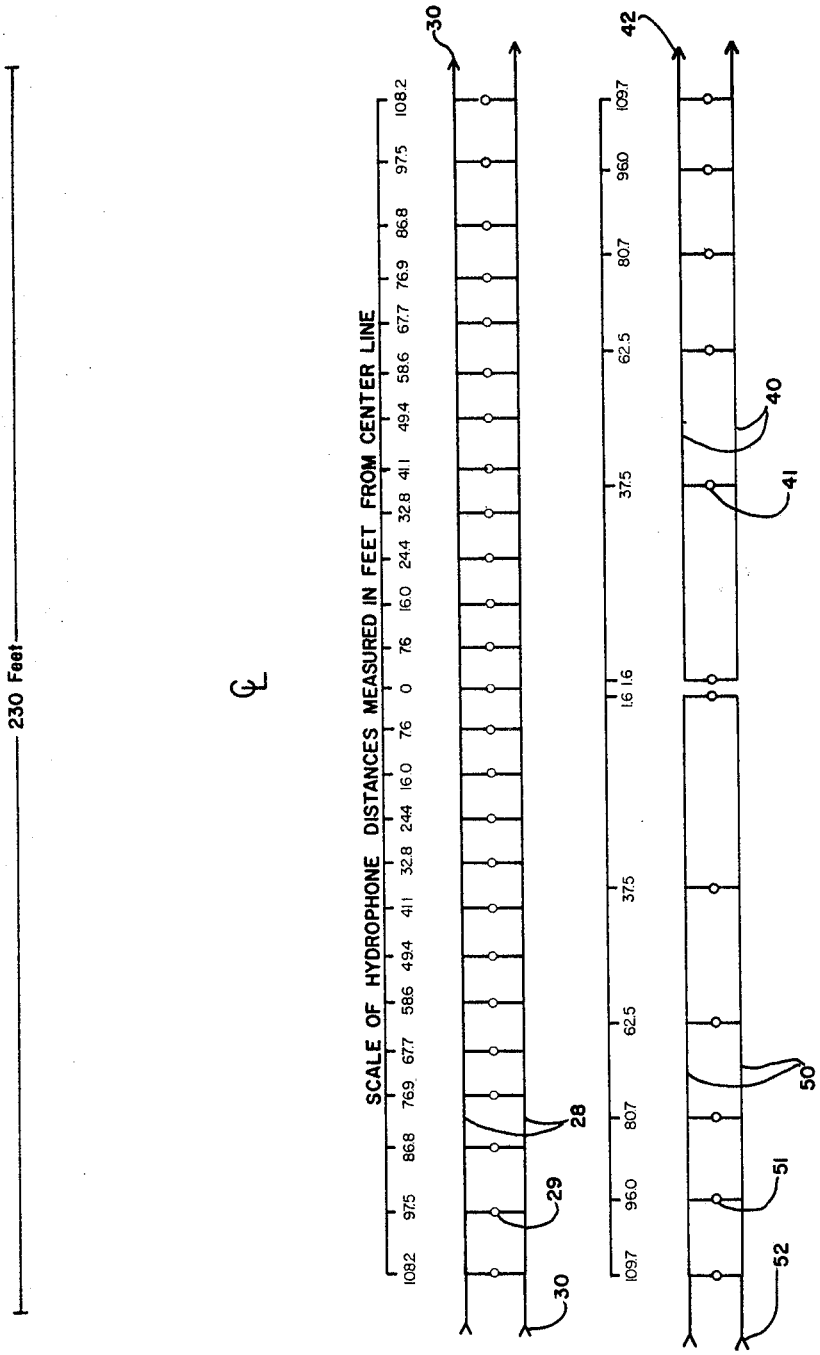
FIGURE 3 shows diagrammatically a physical layout of the arrays in the section shown in FIGURE 2.

FIGURE 3 shows a preferred dimensional layout of the sections shown in FIGURE 2. The total length of each primary array P is about two hundred and thirty feet. Each of the secondary arrays $S_1$ and $S_2$ is about one hundred and eight feet long. Primary array P has twenty-five hydrophones and each of the secondary arrays has six hydrophones. The inter-hydrophone spacings in the secondary arrays increase from the center of the primary array toward the ends of section 16, in accordance with a desired tapering function.

Although this invention has been disclosed and illustrated with reference to particular applications and to a specific embodiment, the principles involved are susceptible of numerous other applications which will be apparent to those skilled in the art. The invention, therefore, is to be limited only as indicated by the scope of the appended claims.

What I claim is:
1. A marine seismic streamer cable for detecting water pressure variations caused by seismic disturbances and for providing corresponding electric signals to processing equipment,
    said streamer cable including:
        a plurality of streamer sections;
        at least a first, a second, and a third of said sections each including a first group of operatively-connected, spaced detectors forming a primary array and producing a primary signal;

said second section further including a second group of operatively-connected spaced detectors forming a first secondary array and producing a first secondary signal;

detachable coupling means electrically connecting the primary array of said first section with the first secondary array of said second section whereby said primary signal and said secondary signal are combined to produce a composite signal for said first section; and coupling means for transmitting said composite signal for said first section to said processing equipment.

2. The streamer cable of claim 1 wherein, said first section further includes a second group of operatively-connected spaced detectors forming a first secondary array and producing a first secondary signal;

detachable coupling means electrically connecting the primary array of said second section with the first secondary array of said first section whereby the primary signal of said second section and the first secondary signal of said first section are combined to produce a composite signal for said second section; and coupling means for transmitting said composite signal for said second section to said processing equipment.

3. The streamer cable of claim 2 wherein, said third section further includes a second group of operatively-connected spaced detectors forming a first secondary array and producing a first secondary signal; and detachable coupling means electrically connecting the primary array of said first section with the first secondary array of said third section, whereby the first secondary signal of said third section is combined with the first secondary signal of said second section and with the primary signal of said first section to produce said composite signal for said first section.

4. The streamer cable of claim 3 wherein, said first section further includes a third group of operatively-connected spaced detectors forming a second secondary array and producing a second secondary signal; and detachable coupling means electrically connecting the primary array of said third section with the second secondary array of said first section whereby the primary signal of said third section and the second secondary signal of said first section are combined to produce a composite signal for said third section; and coupling means for transmitting said composite signal for said third section to said processing equipment.

5. The streamer cable of claim 1 wherein each of said plurality of streamer sections includes:

a first group of operatively-connected, spaced detectors forming a primary array and producing a primary signal;

a second group of operatively-connected spaced detectors forming a first secondary array and producing a first secondary signal;

a third group of operatively-connected spaced detectors forming a second secondary array and producing a second secondary signal;

detachable coupling means at each end of each section for electrically connecting the primary array of each section with a secondary array in each adjacent section, whereby the primary signal of each section is combined with a secondary signal of each adjacent section to produce a composite signal for each section; and coupling means for transmitting the composite signal for each section to said processing equipment.

6. The streamer cable of claim 5 wherein, said detectors in said second and third groups are substantially non-evenly spaced.

7. The streamer cable of claim 4 wherein, each streamer section includes a tubular flexible housing having at each of its ends a seal whereby a fluid-proof chamber is defined by the inner walls of said housing and of said seals; and said detachable coupling means, operatively associated with the primary and secondary arrays are positioned outside of said chamber.

8. The streamer cable of claim 7 wherein, each primary array in each of said sections extends substantially throughout the entire length of each section;

said first secondary array in each of said sections extends from one end of each section a distance which is a substantial portion of the length of said section; and said second secondary array in each of said sections extends from the other end of said section a distance which is a substantial portion of the length of said section.

9. The streamer cable of claim 8 wherein, each of said sections includes a portion of a trunkline extending throughout said streamer cable; and each of said composite signals is transmitted by said trunkline to said processing equipment.

10. The streamer cable of claim 9 and further including:

a waterproof flexible coupling means for coupling each of said sections to an adjacent section and for confining said detachable coupling means to the inside volume defined by said flexible coupling means.

References Cited

UNITED STATES PATENTS 3,299,397   1/1967   Pavey et al. _____ 340—7

RODNEY D. BENNETT, Jr., *Primary Examiner.*

C. E. WANDS, *Assistant Examiner.*

U.S. Cl. X.R.

181—.5